United States Patent [19]

Brennan

[11] Patent Number: 4,609,166

[45] Date of Patent: Sep. 2, 1986

[54] EMERGENCY OXYGEN SYSTEM FOR AIRCRAFT

[75] Inventor: Edward J. Brennan, Litchfield, Conn.

[73] Assignee: PTC Aerospace Inc., Bantam, Conn.

[21] Appl. No.: 699,649

[22] Filed: Feb. 8, 1985

[51] Int. Cl.[4] .............................................. B64D 13/00
[52] U.S. Cl. .................................... 244/118.5; 244/141
[58] Field of Search ................. 244/118.5, 122 A, 141, 244/140; 128/206.27, 202.13, 205.25, 204.18, 204.24

[56] References Cited

U.S. PATENT DOCUMENTS

| | | | |
|---|---|---|---|
| 2,813,690 | 11/1957 | Holmes | 244/140 |
| 3,073,301 | 1/1963 | Hay et al. | 128/206.27 |
| 3,193,223 | 7/1965 | Davis | 244/149 |
| 3,981,302 | 9/1976 | Veit | 244/118.5 |
| 4,481,945 | 11/1984 | Levine | 244/118.5 |

Primary Examiner—Galen Barefoot
Assistant Examiner—Lynn M. Fiorito
Attorney, Agent, or Firm—Barry L. Clark

[57] ABSTRACT

Emergency oxygen system of the type where masks are in compartments in the backs of aircraft seats uses an underseat compartment located under the plane of the seat cushion to house the large canister of chemicals which generate the oxygen when the canister is activated. A spring loaded cable connects the two compartments so that when any of the tether cords connected to each mask is pulled, a locking pin is pulled free from a release mechanism for the cable. Once released, the cable spring immediately moves the cable axially so its lower end can actuate another release mechanism in the canister compartment to activate the canister and produce oxygen. Since the canister can reach a temperature of over 500° F., its removal from the seat back reduces any possibility of burns to passengers while allowing for a lower back height and less back thickness, thereby providing more passenger living space and less obstruction to viewing of visual entertainment.

9 Claims, 9 Drawing Figures

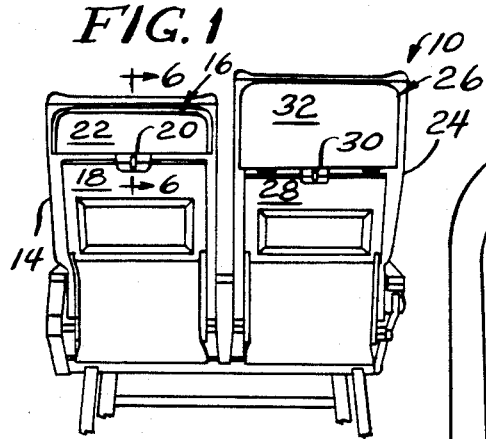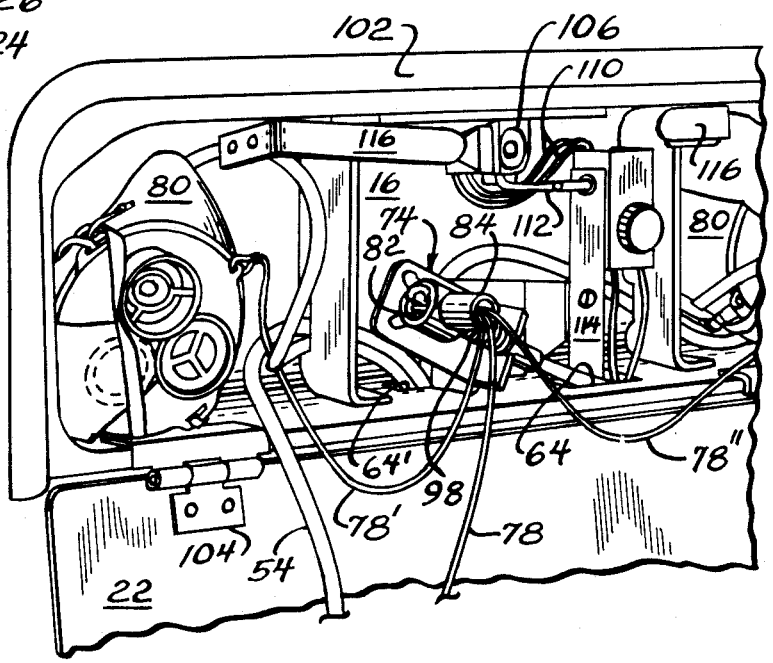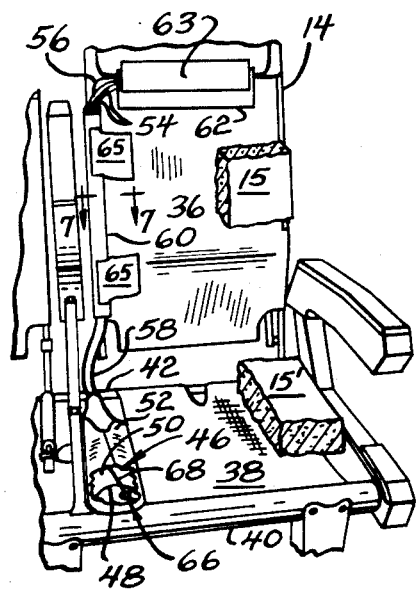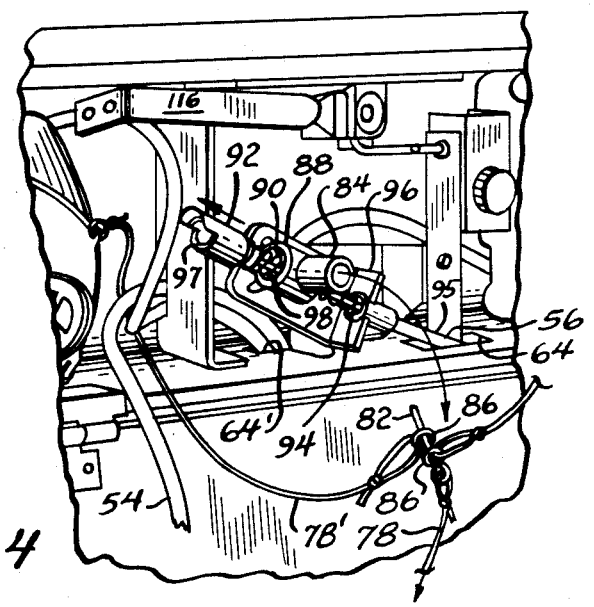

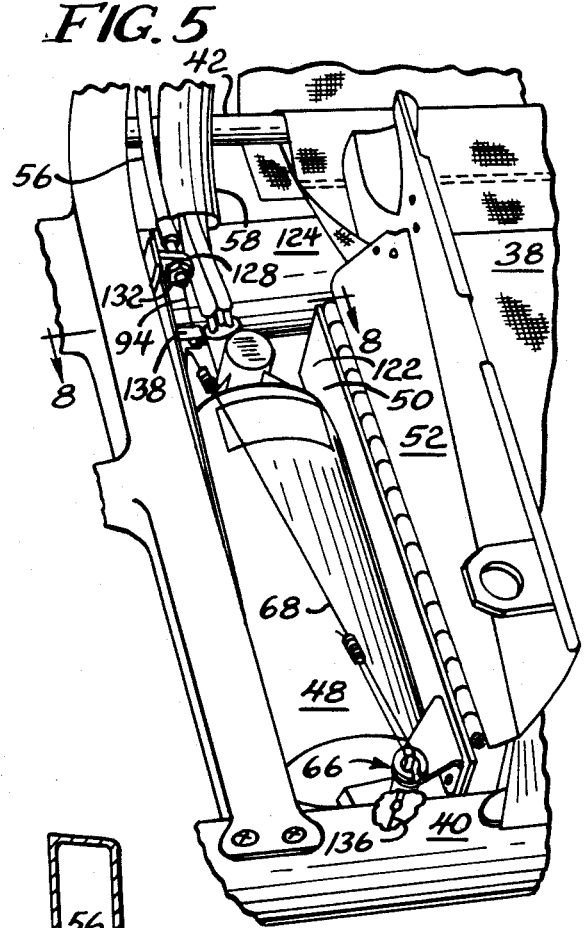
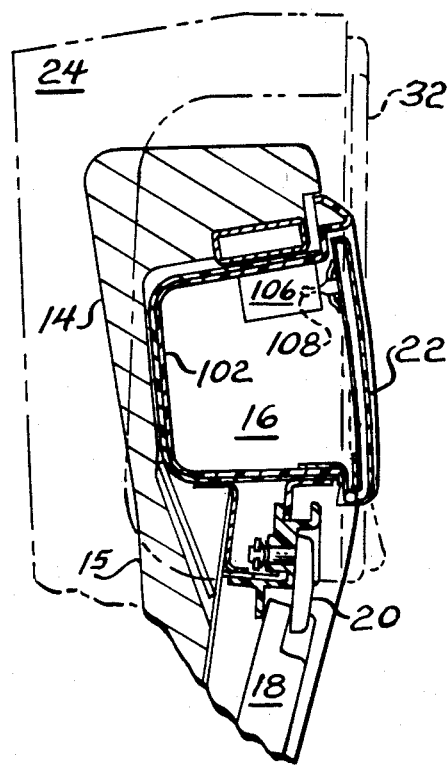
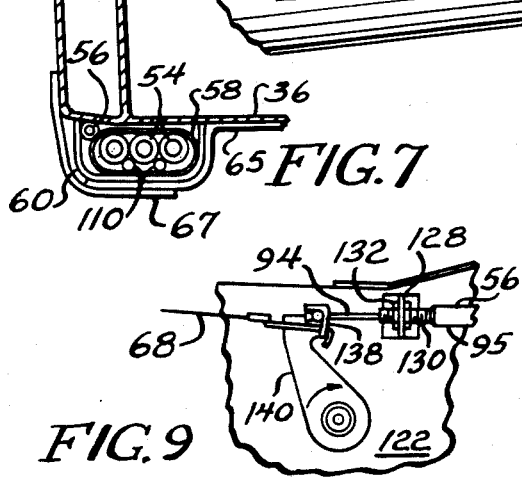
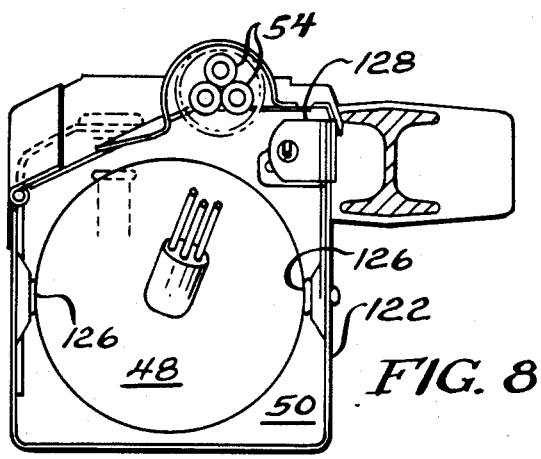

EMERGENCY OXYGEN SYSTEM FOR AIRCRAFT

BACKGROUND OF THE INVENTION

The invention relates to aircraft of the type which employ a pressurized cabin and which fly at altitudes sufficiently high to require a supplemental oxygen system for use in the event of an emergency. More particularly, the invention relates to aircraft of the type designed to have the oxygen system mounted in a compartment in the upper back portion of the passenger seats. Typically, such a system is self-contained and includes oxygen masks, oxygen feed lines, an armed oxygen generating canister, and an electrically and mechanically activated compartment door release mechanism. During an emergency at altitude, the compartment door located on the rear surface of the passenger seat back will open, exposing the emergency system. Usually, two or three masks will be located in each compartment. Upon removal of any one mask by pulling it away from the compartment, a tether attached to the mask will activate the armed oxygen generating canister via a release pin attached to the inner end of the tether, causing oxygen to be generated by the reaction of certain chemicals and allowing it to flow to the masks. While the system is activated, the metal canister surface can reach a temperature of over 500° F. due to the nature of the chemical reaction. The generation of oxygen, once started, cannot be stopped and will proceed for about 20 minutes. Although the oxygen canister is usually somewhat shielded by a perforated metal holder, there would be a possibility that one could burn his fingers if he touched the exposed canister. Also, if the emergency culminates in a hard landing, one's head might be thrown forward against the hot canister. In addition, the compartment containing the system is so deep and so high that it's forward wall would be quite hot in an area on the front of the seat back covered by only a relatively thin layer of foam. This could be uncomfortable or possibly burn a passenger pressing his head against the seat back. In addition, the large compartment size, dictated in good measure by the bulk of the canister, makes it necessary to have higher seat backs than would be desirable to permit comfortable viewing of a movie by many passengers. The vertical height requirement also makes it necessary to use folded tray tables or undesirably small tray tables in the backs of those seats containing the oxygen system. The great depth of the seat back necessitated to accommodate the oxygen system and provide a comfortable thickness of foam in front of it also encrouches on the living space of the passengers as compared to other seats which are spaced at the same distance or pitch but which do not include oxygen systems in their backs. For example, the seats cannot have as great a recline as they could if the seat backs could be made thinner. Also, the existing oxygen system compartment must be vented around the door to prevent excessive heat build-up if the canister were in some manner activated with the door closed or if the door was closed after activation. The vent space permits some cabin air to continually circulate through the compartment and makes it necessary for the interior of the compartment to be periodically cleaned and for smoke stains which might have gotten on the masks to be removed from the masks. Since most masks never get used, the time and expense spent in keeping the compartment clean would seem to be quite unproductive.

SUMMARY OF THE INVENTION

It is among the objects of the present invention to provide an improved oxygen system of the type normally mounted in a seat back as distinguished from those systems mounted in an overhead compartment. Another object is to provide a system which will eliminate the possibility of a passenger getting burned by contact with an oxygen generating canister which has been activated. Yet another object is to provide an oxygen system in which the volume consumed by the components which must be mounted in a compartment in the back of a seat is so reduced as compared to prior art systems that the seat backs can be made of less height and less thickness, thereby facilitating passenger viewing of visual entertainment and allowing considerably more passenger living space for a given pitch or spacing of the seats. The foregoing and other objects and advantages are attained by the embodiment of the invention described hereinafter.

BRIEF DESCRIPTION OF THE DRAWINGS

FIG. 1 is a rear view of a seating unit which, for purposes of comparison only, includes a left seat back including my new oxygen system mask compartment and a right seat back which includes a prior art oxygen system mask compartment;

FIG. 2 is a front perspective view, with the seat cushions removed, showing the covers which protect those portions of the oxygen system which are not enclosed in the mask compartment of FIG. 1;

FIG. 3 is a fragmentary perspective view of the inside of the mask compartment shown on the left seat in FIG. 1 after the door has been actuated and one mask removed, but before the mask has been pulled away sufficiently to release a trigger pin which initiates an actuating means for the generation of oxygen by a chemical cylinder located remotely under the seat;

FIG. 4 is a view identical to FIG. 3 except that it shows the position assumed by an upper end portion of the actuating means immediately upon release of the trigger pin.

FIG. 5 is an enlarged, fragmentary showing of a portion of the seat in FIG. 2 when the cover for the oxygen generating canister compartment has been opened;

FIG. 6 is a sectional view taken on line 6—6 of FIG. 1 but with a prior art headrest and oxygen system compartment superimposed in phantom lines, to illustrate the compactness of the new system;

FIG. 7 is a sectional view taken on line 7—7 of FIG. 2 illustrating the protective cover which protects the oxygen tubes and actuating cable as they pass down the front side edge portion of the seat back;

FIG. 8 is a fragmentary, partially sectioned view of the oxygen generator housing, taken on line 8—8 of FIG. 5, but with the cover up and certain elements omitted for clarity; and FIG. 9 is a fragmentary side view illustrating the connection between the release cable and the cord which is attached to the oxygen canister activating pin.

DETAILED DESCRIPTION OF THE DRAWINGS

Referring to FIG. 1, a seating unit indicated generally at 10 includes a seat back 14 which incorporates an oxygen mask compartment indicated generally at 16. A tray table 18 is also located in the seat back and is retained in its stored position by a latch mechanism 20. The oxygen mask compartment 16 is covered by a pivoted door 22 which is normally closed and locked until such time as the captain actuates its opening mechanism in response to an emergency. Alternatively, the door can be opened by a flight attendant. The figure also includes a prior art seat back which is shown at 24 solely for comparison purposes. The prior art seat back 24 includes an oxygen system compartment indicated generally at 26, a tray table 28, a table latch mechanism 30 and a door 32. As will be readily evident, the smaller size of the oxygen mask compartment 16 of the present invention, as compared to the prior art oxygen system compartment 26, permits the overall height of the seat back 14 to be reduced, while at the same time, permitting the size of the tray table 18 to be larger than the prior art table 28.

FIG. 2 is a front view of the seat back 14 with the major portion of the back and seat cushions 15, 15' removed for clarity. The seat back 14 includes a metal rear cushion support panel 36 and a fabric, preferably nylon, lower cushion support panel 38. The panel 38 is supported at the front of the seat by a front stretcher tube 40, and at the rear of the seat by a rear support rod 42. The oxygen system indicated generally at 46 includes a conventional oxygen generating canister 48, such as the type supplied by Scott Aviation Company, contained in a canister or generator compartment 50. The compartment 50 is normally covered by a hinged cover 52 which is preferably sloped toward the center of the seat so that it will tend to blend together with the nylon panel 38 and not present a hard edge under the weight of a seat occupant seated on a cushion placed on top of it. A plurality of oxygen flow tubes 54 extend from inside the canister compartment 50 up along the front surface of the panel 36 and into the mask compartment 16 located on the upper rear surface of the seat back. A release or control cable assembly 56 extends from the mask compartment 16 along the panel 36 and enters the canister compartment 50 along with the oxygen flow tubes 54. The flow tubes 54 and the cable assembly 56 are protected by a heavy plastic shroud tube 58 as they enter the canister compartment 50. The shroud tube 58 allows the cable 56 and tubes 54 to flex as the seat back 14 is reclined. The upper end of the shroud tube 58 terminates inside the lower end of a hinged, channel-shaped cover member 60, (see FIG. 7) which extends for the major portion of the height of the seat back panel 36. In the region just under the headrest portion of the seat where the tubes 54 and cable are seen to be horizontal, a hinged plate member 62 is provided to protect them. The plate member 62 is hinged to the seat back by a simple fabric hinge 63. The cable 56 and tubes 54 enter the mask compartment 16 through apertures 64, 64', as seen in FIG. 3. The channel-shaped cover member 60 is also hinged by a pair of nylon hinges 65, and held in place by means such as a "Velcro" fastener 67. A pair of cooperating release means are used to activate the oxygen generating canister 48. The first release means, indicated generally at 66, includes the aforementioned release cable member 56 and a nylon cord member 68 which will be hereinafter described in more detail in connection with FIG. 5.

FIGS. 3 and 4 illustrate the second release means, indicated generally at 74. The second release means is shown in its normally loaded position in FIG. 3, and in its actuated position in FIG. 4. The second release mechanism is actuated by pulling on any of the oxygen mask tether cords 78, 78' or 78" by simply grabbing one of the masks 80 and pulling it smartly away from the compartment 16. The tether cords are relatively short compared to the length of the oxygen flow tubes 54 so a sharp pull on any of the masks will tension the cord and cause the release pin 82 mounted on the end of cord 78 to be removed from the pin guide sleeve 84. The tether cords 78', 78" are preferably not permanently engaged with the end of the release pin 82, as is the cord 78. Rather, they have small rings 86 on their outer ends which are adapted to be slipped onto the pin 82 so that no matter which cord is pulled, the pin 82 will be pulled out of the pin guide sleeve. However, as soon as the release pin is free of the pin guide sleeve, the rings 86 will fall off the release pin, thus releasing the connection of the various tether cords to each other. Once the tether cords are released, the masks can be moved individually as far as the length of their flow tubes 54 will allow. The pin guide sleeve 84 has a small diameter inner aperture (not shown) which supports the release pin in its normally latched position in which it is arranged transversely of the end of the release cable locking sleeve 88 and frictionally held thereby. The sleeve 88 has an enlarged central bore 90 which guidingly supports a release element 92. The release element 92 is mounted on the end of a control wire 94 which can move inside of and along the axis of the tubular shroud 95 of the release cable 56. The shroud 95 is fixedly mounted relative to the seat back 14 and the sleeve element 88 by a shroud support bracket 96. The release element 92 is strongly urged axially outwardly into contact with the release pin 82 by a coiled compression spring 98 which engages the bracket 96 at one of its ends and a shouldered portion at the inner end of the release element 92 on its other end. When the release pin 82 is pulled out of its restraining relation with an outer shouldered end portion 97 of the release element 92, as seen in FIG. 4, the compression spring 98 will expand about one inch and instantly move the control wire 94 relative to its shroud 95 by the same amount. The force of the spring 98 is preferably selected to provide about double the force needed to cause the aforementioned first release mechanism to trigger the activation of the oxygen generating canister 48.

The oxygen mask compartment 16 preferably includes a vacuum formed plastic housing 102 to which door 22 is attached by hinges 104. The opening of the door is preferably accomplished electrically by the actuation of a control by the captain or other crew member which energizes a conventional solenoid release mechanism 106 to cause disengagement of the latch pin 108 (FIG. 6) mounted in the door 22. The power for the solenoid latch mechanism is provided through wires 110. If the solenoid actuated release mechanism should, for any reason, fail, or if oxygen should be required at only a single compartment 16, a flight attendant can manually open the door 22 in a manner not readily obvious to passengers. In such a situation, a mechanical link member 112 will trigger the solenoid latch mechanism 106 when the lever 114 is pivoted manually by the flight attendant. Access to the lever 114 can be had when the tray table 18 is deployed from the seat back. Irrespective of whether the latch 106 is released electrically or mechanically, the door 22 will fly open due to the force of a pair of springs 116 which are mounted at the top of housing 102. As previously described, when the door 22 is open, the plurality of masks 80 will be exposed and available for use of a passenger who can initiate the flow of oxygen through tubes 54 by jerking the mask to pull the tether cord 78 and thus the release pin 82.

FIGS. 5 and 8 show details of the canister compartment 50 with its cover 52 raised so as to provide access to the oxygen generating canister 48. The compartment housing 122 is preferably formed of sheet metal and has a bottom portion attached to the underside of the front stretcher member 40 and the rear stretcher member 124 which form portions of the seat chassis. The canister housing 122 includes a plurality of dimples 126 formed in its sides which support the canister 48 at a small distance from the walls of the housing. The resultant spacing insures that an insulating region of air will be formed around the canister, thus keeping the housing at a significantly lower temperature than the canister, which, as mentioned, can reach over 500 degrees F. The previously referenced first release means 66 can be seen to include a bracket 128 mounted on the housing 122. The lower end 130 of the shroud portion 95 of the release cable 56 is threaded along about an inch of its length to provide some degree of position adjustment relative to the bracket 128 by threading a pair of nuts 132 on the shroud on either side of the bracket 128. The position adjustment for the shroud portion 95 simultaneously adjusts the position of the lower end of the control wire 94. Thus, it allows the cord 68 to be tensioned or loosened to take up any excess slack that is present when the canister activating pin 136 on its end is in its normal position of engagement with the canister 48, or to prevent any movement of the cord that would move the pin 136.

Preferably, as seen most clearly in FIG. 9, the control wire 94 and the cord 68 are attached to spaced portions of a common flange 138 which extends normal to the plane of travel of a pivoted bracket member 140. If the cord 68 is even just slightly taut, the actuation of the upper release pin 82 in the upper compartment will permit the cord 68 to be pulled a distance at least about twice that which is necessary to remove the pin 136 from the canister, thus providing a substantial safety factor. By connecting the control wire 94 to the pivoted bracket member 140, rather than directly to the cord 68, the servicing of the seat back 14 is facilitated since the cable assembly 56 can be easily disconnected or connected if it should become necessary for a seat back to be replaced.

A summary of the operation of the improved oxygen system is as follows: Upon actuation of solenoid lock 106, the springs 116 throw the door 22 open. A passenger grabs a mask 80 and pulls it sharply to jerk the tether cord 78 and cause the release pin 82 to be removed from its FIG. 3 position in engagement with shoulder portion 97 of release element 92. Once element 92 is released, it is projected out of the sleeve 88 by the compressed spring 98 and moves control wire 94 relative to its tubular outer shroud 95 to its FIG. 4 position. This movement of the upper end of the wire 94 will cause the lower end of the wire to force bracket 140 to pivot clockwise (FIG. 9) and will simultaneously jerk on cord 68 and cause the oxygen canister activating pin 136 which is on its lower end to be pulled free of the canister 48. As the pin 136 is removed, the canister firing pin (not shown) is activated by a spring (not shown) to trigger the reaction of the chemicals contained therein to produce oxygen. The oxygen so produced will then flow through tubes 54 to the masks 80. Because the canister 48 is located under the compartment cover 52 and under the seat cushion 15', the tremendous heat generated within the canister is safely kept at a location wherein it will be incapable of burning a passenger's fingers or head.

I claim as my invention:

1. In an emergency oxygen system for an aircraft of the type having a plurality of oxygen masks normally stored in a mask compartment located behind a normally locked door in an upper rear portion of the back of one seat position of a multi-passenger seating unit, said seating unit having a chassis for supporting seat cushion means for each seat position of said seating unit and at least said back of said one seat position, the improvement wherein a generator compartment for containing an oxygen generating canister is attached to said chassis at a remote location relative to said mask compartment, said generator compartment being positioned at least substantially under the plane of said seat cushion means, said generator compartment housing both an oxygen generator canister positioned therein and a first release mechanism for activating said canister to produce oxygen, a plurality of oxygen flow tubes being joined at their opposite ends to said canister and to said plurality of oxygen masks, and a control cable assembly including a longitudinally movable control wire extending between said mask compartment and said generator compartment, said control wire being attached to said first release mechanism at its lower end and to a second release mechanism at its upper end, said control wire being operable at its said lower end to activate said first release mechanism so as to cause oxygen to be generated by said generator and to flow to said oxygen masks when its said upper end is moved longitudinally by a force applies to it by said second release mechanism in response to a pulling force applied to a mask by a passenger, said masks including a tether member which actuates said second release mechanism when pulled.

2. The oxygen system of claim 1 wherein said oxygen tubes and said control cable assembly are supported by the front surface of said back of said one seat position and are isolated and protected by cover means from direct contact with seat cushion means which are adapted to overlie said back.

3. The oxygen system of claim 2 wherein said cover means includes an elongated channel member mounted to a side edge portion of said back.

4. The oxygen system of claim 3 wherein said channel member is hinged to said back for access to said oxygen flow tubes and control cable assembly, said channel member and back further including complementary fastening means.

5. The oxygen system of claim 3 wherein said cover means includes a thick-walled flexible tubular sheath which surrounds said flow tubes and cable assembly and extends from at least the lower end portion of the channel member to the generator compartment, said tubular sheath serving to permit flexure of said flow tubes and cable assembly in the region of the seat located between the back and seat cushions when the back is reclined relative to the chassis.

6. The oxygen system of claim 1 wherein said control cable assembly includes a tubular outer shroud portion which surrounds and protects said movable control wire, said tubular outer shroud portion being threaded at at least one end of said cable assembly for a sufficient portion of its length to permit a complementary adjustment nut to be located at various positions thereon.

7. The oxygen system of claim 1 wherein said generator compartment has a first guide bracket member fixedly mounted adjacent one end thereof for guiding the generally vertically positioned canister activating pin end of an activating cord assembly which forms a portion of said first release mechanism so that a generally horizontal pulling force applied to the other end of the cord assembly, in the generally longitudinal direction of the axis of the canister, will cause the activating pin to be separated from said canister, thereby activating said canister.

8. The oxygen system of claim 7 wherein a second bracket member is mounted for pivotal movement adjacent the opposite end of the generator compartment, said second bracket member having one portion engaged with one end of said control wire and another portion engaged with the end of said cord assembly which is opposite to the end with the canister activating pin.

9. The oxygen system of claim 6 wherein said second release mechanism includes a bracket fixedly mounted in said mask compartment and having a support portion for fixedly mounting the upper end of said tubular shroud, said support portion supporting said control cable assembly in alignment with a guide sleeve element which is also fixedly mounted on said last named bracket at a predetermined distance from said support portion, said guide sleeve element having an aperture through its side wall near its end which is remote from said support portion, said aperture being adapted to support a release pin element attached to the end of said tether member and retain it in a position normal to the axis of said guide sleeve element, a release element mounted on the upper outer end of the control wire, said release element having an outer side surface which is complementary to the inner surface of said guide sleeve element, a compression spring mounted in surrounding relation to said control wire and positioned so as to be retained at one of its ends by said support portion attached to said tubular shroud and at its other end by the inner end surface of said release element, said spring being compressed to at least substantially its maximum extent when said release element is sufficiently retracted within said guide sleeve element that said release pin element can be located in said aperture in said guide sleeve element and have an end portion positioned sufficiently across an outer end portion of said release element that it will prevent outward movement of said release element, said spring having sufficient force and sufficient length that, when said release pin element is released, it will cause said control wire to move a sufficient distance relative to said tubular shroud that its lower end portion will activate said first release mechanism.

* * * * *